(12) United States Patent
Cina

(10) Patent No.: US 7,739,376 B2
(45) Date of Patent: Jun. 15, 2010

(54) MESSAGE FILTERING

(75) Inventor: Miroslav Cina, Ratingen (DE)

(73) Assignee: SAP Aktiengesellschaft, Walldorf (DE)

( * ) Notice: Subject to any disclaimer, the term of this patent is extended or adjusted under 35 U.S.C. 154(b) by 1083 days.

(21) Appl. No.: 11/075,173

(22) Filed: Mar. 7, 2005

(65) Prior Publication Data
US 2006/0200526 A1 Sep. 7, 2006

(51) Int. Cl.
G06F 15/173 (2006.01)
G06F 15/16 (2006.01)
G06F 11/00 (2006.01)

(52) U.S. Cl. .................. 709/224; 714/57; 709/207
(58) Field of Classification Search .................. 714/57, 714/48; 709/207, 224
See application file for complete search history.

(56) References Cited

U.S. PATENT DOCUMENTS

| 4,481,577 | A | * | 11/1984 | Forson | 707/1 |
| 5,483,637 | A | * | 1/1996 | Winokur et al. | 714/26 |
| 5,790,779 | A | * | 8/1998 | Ben-Natan et al. | 714/39 |
| 6,269,460 | B1 | * | 7/2001 | Snover | 714/48 |
| 7,137,043 | B1 | * | 11/2006 | Kane et al. | 714/57 |
| 7,139,938 | B2 | * | 11/2006 | Marwaha | 714/48 |
| 7,171,689 | B2 | * | 1/2007 | Beavers | 726/22 |
| 7,239,234 | B2 | * | 7/2007 | Cina | 340/501 |
| 7,346,922 | B2 | * | 3/2008 | Miliefsky | 726/3 |
| 7,509,536 | B1 | * | 3/2009 | Kane et al. | 714/46 |
| 2002/0124214 | A1 | * | 9/2002 | Ahrens et al. | 714/57 |
| 2004/0128353 | A1 | * | 7/2004 | Goodman et al. | 709/204 |
| 2005/0010392 | A1 | * | 1/2005 | Chen et al. | 704/8 |
| 2006/0112007 | A1 | * | 5/2006 | Hurwitz et al. | 705/40 |
| 2006/0129484 | A1 | * | 6/2006 | Hurwitz et al. | 705/40 |
| 2006/0156077 | A1 | * | 7/2006 | Altaf et al. | 714/57 |
| 2007/0210908 | A1 | * | 9/2007 | Putterman et al. | 340/506 |

* cited by examiner

Primary Examiner—Douglas B Blair
(74) Attorney, Agent, or Firm—Fish & Richardson P.C.

(57) ABSTRACT

Methods and systems, including computer program products, implementing techniques for message filtering. The techniques include receiving a plurality of messages generated by an application, and filtering the messages, including simplifying one or more of the messages, eliminating one or more of the messages, or both simplifying and eliminating messages. The messages report errors in the execution of the application or provide warnings about possible errors.

17 Claims, 3 Drawing Sheets

300

| Simplification Table ||
|---|---|
| Difficult-to-Understand Messages | Simplified Content |
|  |  |
|  |  |
|  |  |
|  |  |

| Rule Table ||
|---|---|
| Message Group | Criteria |
| Redundant Messages | Message Priority |
| Contradictory Messages | Message Type |
|  |  |
|  |  |

FIG. 4

MESSAGE FILTERING

BACKGROUND

The present invention relates to data processing by digital computer, and more particularly to message filtering.

Messages generated by computer systems can be difficult for end users to understand. For example, error messages generated by computer systems often contain technical content that is cryptic and confusing to the non-programmer user.

Users can also become confused when too many error messages are displayed, particularly when some of the messages are redundant or contradictory.

In some systems, the generated messages are first sent to a message collector and then retrieved from the messages collector when the system is ready to present the messages to a user.

SUMMARY OF THE INVENTION

In one general aspect, the present invention provides methods and systems, including computer program products, implementing techniques for message filtering. The techniques include receiving a plurality of messages generated by an application and filtering the messages, including simplifying one or more of the messages, eliminating one or more of the messages, or both simplifying and eliminating messages. The messages report errors in the execution of the application or provide warnings about possible errors.

The techniques can further include sending the filtered messages to a user.

Particular implementations of the invention can include one or more of the following features.

Simplifying the content of one or more of the messages includes accessing a table that stores simplified content for each of one or more of the messages and changing the content of one or more of the messages to the corresponding simplified content.

The messages are eliminated based on rules. Each rule identifies a group of messages and specifies criteria for eliminating one or more messages from the group.

The group is a group of redundant messages or contradictory messages.

The criteria includes message priority or message type.

The invention can be implemented to realize one or more of the following advantages. Messages that have been filtered using the techniques described here are easy for users to understand. Messages that are contradictory or redundant are eliminated.

One implementation of the invention provides all of the above advantages.

Details of one or more implementations of the invention are set forth in the accompanying drawings and in the description below. Further features, aspects, and advantages of the invention will become apparent from the description, the drawings, and the claims.

BRIEF DESCRIPTION OF THE DRAWINGS

FIG. 3 illustrates a simplification table.

FIG. 4 illustrates a rule table.

Like reference numbers and designations in the various drawings indicate like elements.

DETAILED DESCRIPTION

Figure 1:
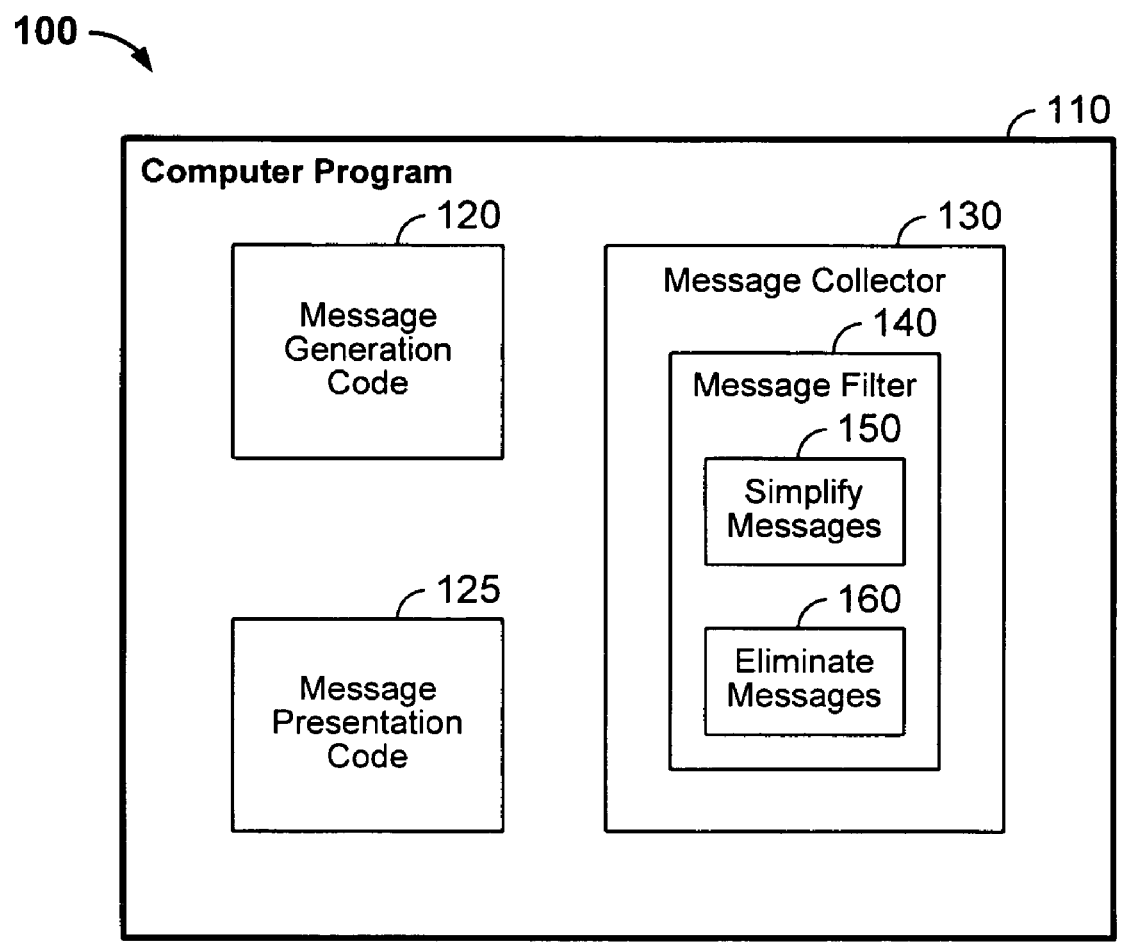
FIG. 1 illustrates a system in accordance with one implementation of the invention.

As shown in FIG. 1, a system 100 in accordance with one implementation of the invention includes an application or computer program 110.

The computer program 110 includes message generation code 120 that generates error messages when the computer program 110 fails to execute properly. The message generation code 120 can also generate warning messages upon detecting possible errors in the computer program 110, for example, errors provoked by invalid data input.

The computer program 110 can also include message presentation code 125 that presents the generated messages as output to a user of the computer program 110. This output, however, is not part of the normal program output that is produced when the computer program 110 is executing properly. The user can be a human user, or alternatively, can be another computer program. The presentation of the messages can be visual or non-visual.

The message generation code 120 and the message presentation code 125 of the computer program 110 can be implemented using conventional techniques for generating and presenting messages.

As shown in FIG. 1, the computer program 110 further includes a message collector 130. As the messages are generated, the message generation code 120 sends the messages to the message collector 130. When the message presentation code 125 is ready to present the messages or otherwise to make use of the messages, the message presentation code 125 can retrieve the messages from the message collector 130.

The message collector 130 can respond to three types of requests:

1. Write Message—A write message request causes the message collector 130 to store a message. The message to be stored can be passed in as a parameter of the request.

2. Delete Messages—A delete messages request causes the message collector 130 to delete all stored messages.

3. Read Messages—A read messages request causes the message collector 130 to send the stored messages to the requesting process. Before sending the stored messages, the message collector 130 passes the stored messages through a message filter 140. Message filtering includes simplifying messages 150, eliminating messages 160, or both, as will be described below.

Message simplification involves identifying messages that are difficult to understand and replacing the original content of these messages with simplified content. The message filter 140 can access a simplification table that identifies the difficult-to-understand messages and provides simplified content for each of the difficult-to-understand messages. An example of a simplification table 300 is illustrated in FIG. 3.

Message elimination involves applying a set of predefined rules to the messages. The rules can include grouping rules and default grouping rules. As illustrated in FIG. 4, the rules can be implemented as one or more rule tables 400.

The grouping rules identify groups of messages. Messages that are contradictory to each other can be grouped together in one group.

For example, the following two messages are contradictory:

Message 1: User not authorized

Message 2: No account balance exists for data

Messages that are redundant to each other can be grouped together in another group. Redundant messages can arise when a single error condition causes multiple processes to fail and each process generates a separate error message. In such a case, it may not be necessary to present all of the generated messages to a user.

For example, the following two messages are redundant:
Message 1: Business partner 'AAA' does not exist
Message 2: No description found for business partner 'AAA'

The grouping rules specify criteria for eliminating one or more messages from each group. The criteria can refer to one or more message attributes including, but not limited to, message type and message priority. For example, one rule can specify that only the highest priority message in a particular group be retained. Another rule can specify that any message that is a warning message be eliminated from a particular group.

The default grouping rules specify that, in the event that the stored messages do not match any of the groups identified by the grouping rules, then all of the stored messages are to be eliminated and replaced with a default message.

Figure 2:
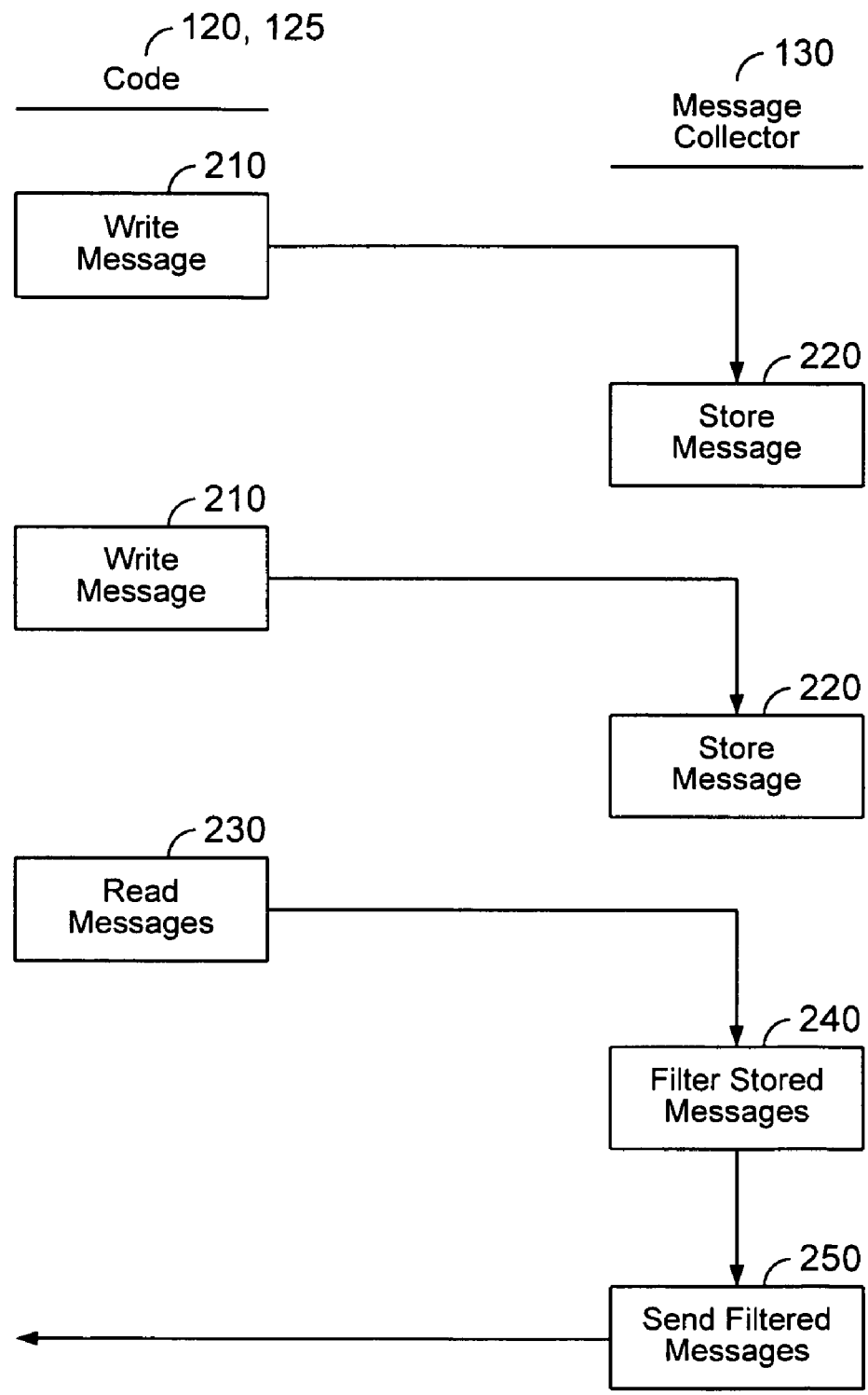
FIG. 2 illustrates a method in accordance with one implementation of the invention.

As shown in FIG. 2, in a method 200 in accordance with one implementation of the invention, the message collector 130 receives one or more write message requests from the computer program 110 (step 210). The message collector 130 stores the messages, or a reference to the messages, identified in the requests (step 220).

Subsequently, the message collector 130 receives a read messages request from the computer program 110 (step 230). In response, the message collector 130 filters all of the stored messages (step 240) using the message filter 140 described above. The message collector 130 then sends the filtered messages to the computer program 110 (step 250).

The read messages request can have a filter on/off parameter that specifies whether to filter the messages or not. When the parameter is set to off, then the message collector 130 does not pass the stored messages through the message filter 140 before sending the messages to the computer program 110. When the parameters are set to on, then the message collector 130 does use the message filter 140, but also saves the original messages in case they are requested later. For example, in some situations, the message collector 130 may first receive a read messages request where the filter parameter is set to on, and then subsequently, receive a second read messages request where the filter parameter is set to off. This situation might occur when a user views the filtered messages and then desires to view the unfiltered version of the messages.

The steps of method 200 can be performed during productive use of the computer program 110 by end users, as opposed to during developmental use by developers or test users.

The message filter 140 can be implemented as a plug-in. The plug-in can be installed in an existing system to extend the functionality of the message collection.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine readable storage device, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular implementations, but other implementations are within the scope of the following claims. For example, although the message collector 130 has been described as a service that is provided to the computer program 110, one skilled in the art would appreciate that the computer program 110 itself could also perform the functionality provided by the message collector 130. Also, in certain implementations, multitasking and parallel processing may be preferable.

What is claimed is:

1. A machine-readable storage device having machine readable instructions tangibly stored thereon which when executed by the machine, cause the machine to perform operations comprising:

receiving a write message request at a message collector of an application;

storing a plurality of messages generated by the application in response to receiving the write message request, each message of the plurality of messages reporting an error in the execution of the application, or providing warnings about a possible error in the execution of the application;

receiving a read messages request at the message collector;

determining a state of a filter parameter in the read messages request;

filtering the plurality of messages using a message filter of the application to provide filtered messages when the filter parameter in the read messages request is set to on, filtering comprising identifying at least one message of the plurality of messages as a message that is difficult to understand based on using the at least one message as an input to a table, replacing original content of the at least one message with simplified content that is provided in the table and that is identified based on the input;

sending the filtered messages to a requesting process of the application when the filter parameter is on; and sending the plurality of messages to the requesting process of the application when the filter parameter is off.

2. The machine-readable storage device of claim 1, wherein filtering further comprises eliminating one or more of the messages based on rules, each rule identifying a group of messages and specifying criteria for eliminating one or more messages from the group, the group including messages with redundant content or messages with contradictory content.

3. The machine-readable storage device of claim 2, wherein the criteria includes message priority or message type.

4. The machine-readable storage device of claim 1, wherein each message to be stored is received as a parameter of the write message request.

5. The machine-readable storage device of claim 1, wherein the messages are stored at a storage before being filtered if the filter parameter is set to on.

6. The machine-readable storage device of claim 1, further comprising instructions to perform operations comprising:

in response to receiving the write message request at the message collector, providing a reference identifying the plurality of messages; and storing the reference in a storage device.

7. A computerized method, comprising:

receiving a write message request at a message collector of an application;

storing a plurality of messages generated by the application in response to receiving the write message request, each message of the plurality of messages reporting an error in the execution of the application, or providing warnings about a possible error in the execution of the application;

receiving a read messages request at the message collector;

filtering the plurality of messages using a message filter of the application to provide filtered messages when the filter parameter in the read messages request is set to on, filtering comprising identifying at least one message of the plurality of messages as a message that is difficult to understand based on using the at least one message as an input to a table, replacing original content of the at least one message with simplified content that is provided in the table and that is identified based on the input;

sending the filtered messages to a requesting process of the application when the filter parameter is on; and sending the plurality of messages to the requesting process of the application when the filter parameter is off.

8. The method of claim 7, wherein filtering further comprises eliminating one or more of the messages based on rules, each rule identifying a group of messages and specifying criteria for eliminating one or more messages from the group, the group including redundant messages or contradictory messages.

9. The method of claim 8, wherein the criteria includes message priority or message type.

10. The method of claim 7, wherein each message to be stored is received as a parameter of the write message request.

11. The method of claim 7, wherein the messages are stored to a storage before being filtered if the filter parameter is set to on.

12. A computer system, the computer system including a processor and memory, the processor in communication with the memory, the memory tangibly storing instructions comprising:

a message collector module of an application to receive a plurality of messages generated by the application, each message of the plurality of messages reporting an error in the execution of the application, or providing warnings about a possible error in the execution of the application, the message collector module storing the plurality of messages in response to receiving a write message request, the message collector module receiving a read messages request;

a message filter module of the application to filter the plurality of messages when a filter parameter in the read messages request is set to on, filtering comprising identifying at least one message of the plurality of messages as a message that is difficult to understand based on using the at least one message as an input to a table, replacing original content of the at least one message with simplified content that is provided in the table and that is identified based on the input, the message filter module sending the filtered messages to a requesting process of the application when the filter parameter is on, and sending the plurality of messages to the requesting process of the application when the filter parameter is off.

13. The system of claim 12, wherein filtering further comprises eliminating one or more of the messages based on rules, each rule identifying a group of messages and specifying criteria for eliminating one or more messages from the group, the group including redundant messages or contradictory messages.

14. The system of claim 13, wherein the criteria includes message priority or message type.

15. The system of claim 12, wherein the message filter module is a plugin to be added to a computer system on demand.

16. The system of claim 12, wherein each message to be stored is received as a parameter of the write message request.

17. The system of claim 12, wherein the messages are stored to a storage before being filtered if the filter parameter is set to the on.

* * * * *